United States Patent
Frampton et al.

(10) Patent No.: US 11,274,673 B2
(45) Date of Patent: *Mar. 15, 2022

(54) DUAL COMPRESSOR TURBOCHARGER

(71) Applicant: Kohler Co., Kohler, WI (US)

(72) Inventors: Isaac S. Frampton, Strattanville, PA (US); Robert J. Danforth, III, Sheboygan Falls, WI (US); Paul Honkanen, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 508 days.

This patent is subject to a terminal disclaimer.

(21) Appl. No.: 15/380,396

(22) Filed: Dec. 15, 2016

(65) Prior Publication Data

US 2017/0097004 A1 Apr. 6, 2017

Related U.S. Application Data

(63) Continuation of application No. 14/517,300, filed on Oct. 17, 2014, now Pat. No. 9,556,792.

(51) Int. Cl.
*F04D 25/16* (2006.01)
*F02C 6/12* (2006.01)
(Continued)

(52) U.S. Cl.
CPC ............. *F04D 25/16* (2013.01); *F02B 37/18* (2013.01); *F02B 37/24* (2013.01); *F02C 6/12* (2013.01);
(Continued)

(58) Field of Classification Search
CPC .... F02B 53/14; F02B 2053/005; F02B 55/16; F02B 55/02; F02B 55/08; B60K 5/00;
(Continued)

(56) References Cited

U.S. PATENT DOCUMENTS 4,867,109 A 9/1989 Tezuka
5,121,604 A * 6/1992 Berger ................ F02D 41/0007
60/602

(Continued)

FOREIGN PATENT DOCUMENTS

EP 0812980 A2 * 12/1997 ......... F02M 21/0284
JP 2006241979 A 9/2006
WO WO2015000599 A1 1/2015

OTHER PUBLICATIONS

Natural Gas Engine, May 7, 2014, aircompressor.org/html/technology/nat_gas/engines.html.

*Primary Examiner* — Hoang M Nguyen
(74) *Attorney, Agent, or Firm* — Lempia Summerfield Katz LLC

(57) ABSTRACT

A dual compressor turbocharger includes two compressors. One compressor supplies fuel pressure, and one compressor supplies air pressure. The dual compressor turbocharger includes a turbine driven by exhaust of an engine and a shaft coupled to the turbine. The first compressor is mounted on the shaft and includes a first inlet coupled to an air supply and a first outlet coupled to an air intake of the engine. The second compressor is mounted on the shaft and includes a second inlet coupled to a fuel supply and a second outlet coupled to a fuel supply rail of the engine.

16 Claims, 10 Drawing Sheets

(51) Int. Cl.
*F02B 37/18* (2006.01)
*F02B 37/24* (2006.01)
*F02M 35/10* (2006.01)
*F02D 9/10* (2006.01)
*F02D 41/00* (2006.01)
*F02M 55/02* (2006.01)
*F02M 37/04* (2006.01)
*F02M 37/14* (2006.01)

(52) U.S. Cl.
CPC ......... *F02D 9/105* (2013.01); *F02D 41/0007* (2013.01); *F02M 35/1038* (2013.01); *F02M 35/10157* (2013.01); *F02M 35/10386* (2013.01); *F02M 55/025* (2013.01); *F02M 35/10118* (2013.01); *F02M 37/045* (2013.01); *F02M 37/14* (2013.01); *F05D 2220/40* (2013.01); *Y02T 10/12* (2013.01)

(58) Field of Classification Search
CPC ... B60K 5/02; Y02T 10/17; F02D 2041/0012; F02D 17/00; F02D 13/06; F02D 25/04
USPC .......................... 60/605.1–612; 417/406–409
See application file for complete search history.

(56) References Cited

U.S. PATENT DOCUMENTS

| | | | |
|---|---|---|---|
| 5,168,839 A | 12/1992 | Hitomi | |
| 5,186,005 A | 2/1993 | Yoshioka et al. | |
| 5,249,934 A * | 10/1993 | Merritt | F04D 29/5853 417/406 |
| 5,273,014 A | 12/1993 | Mitobe | |
| 5,329,757 A | 7/1994 | Faulkner et al. | |
| 5,622,053 A * | 4/1997 | Freen | F02B 33/44 123/299 |
| 5,682,737 A | 11/1997 | Schmidli | |
| 5,694,761 A | 12/1997 | Griffin, Jr. | |
| 5,713,340 A | 2/1998 | Vandenberghe et al. | |
| 5,899,070 A | 5/1999 | Droessler et al. | |
| 6,039,029 A | 3/2000 | Nagasaka | |
| 6,075,874 A | 6/2000 | Higashikubo et al. | |
| 6,327,856 B1 | 12/2001 | Iwabuchi et al. | |
| 6,345,503 B1 | 2/2002 | Gladden | |
| 6,418,723 B1 | 7/2002 | Gladden | |
| 6,662,772 B1 | 12/2003 | Murphy | |
| 6,871,642 B1 | 3/2005 | Osterwald | |
| 7,634,983 B2 | 12/2009 | Grant | |
| 7,650,222 B2 | 1/2010 | Shiraishi et al. | |
| 7,739,026 B2 | 6/2010 | Kuzuyama et al. | |
| 8,181,462 B2 | 5/2012 | Arnold et al. | |
| 8,347,861 B2 | 1/2013 | Shimizu et al. | |
| 8,561,403 B2 | 10/2013 | VanDyne et al. | |
| 9,032,933 B2 | 5/2015 | Saito | |
| 9,086,022 B2 | 7/2015 | Shimizu et al. | |
| 9,556,792 B2 * | 1/2017 | Frampton | F04D 25/16 |
| 9,638,095 B1 | 5/2017 | Clarke | |
| 2005/0205067 A1 | 9/2005 | Koide | |
| 2005/0220616 A1 * | 10/2005 | Vogiatzis | F01D 5/141 415/208.1 |
| 2006/0248888 A1 | 11/2006 | Geskes | |
| 2009/0183507 A1 * | 7/2009 | Weaver | F02D 41/2438 60/602 |
| 2009/0199813 A1 | 8/2009 | Kuzuyama et al. | |
| 2010/0018491 A1 | 1/2010 | Fornara | |
| 2010/0319343 A1 * | 12/2010 | Arnold | F02B 37/007 60/605.1 |
| 2012/0227397 A1 | 9/2012 | Willi et al. | |
| 2013/0104831 A1 | 5/2013 | Cuniberti | |
| 2013/0152900 A1 | 6/2013 | Masubuchi | |
| 2013/0220278 A1 | 8/2013 | Nishio et al. | |
| 2013/0220289 A1 | 8/2013 | Maceroni | |
| 2013/0261944 A1 | 10/2013 | Koshizen | |
| 2013/0319381 A1 | 12/2013 | Arvizu Dal Piaz | |
| 2014/0060041 A1 * | 3/2014 | Makino | F02B 37/127 60/602 |
| 2014/0076291 A1 | 3/2014 | Wong | |
| 2014/0136079 A1 | 5/2014 | Sivasubramanian et al. | |
| 2014/0373531 A1 | 12/2014 | Wong | |
| 2015/0040562 A1 | 2/2015 | Anderson et al. | |
| 2015/0059696 A1 | 3/2015 | Frampton et al. | |
| 2015/0346733 A1 | 12/2015 | Yates et al. | |
| 2018/0171907 A1 | 6/2018 | Ulrey | |

\* cited by examiner

DUAL COMPRESSOR TURBOCHARGER

This application is a continuation under 35 U.S.C, § 120 and 37 C.F.R. § 1.53(b) of U.S. patent application Ser. No. 14/517,300 filed Oct. 17, 2014, which is hereby incorporated by reference in its entirety.

TECHNICAL FIELD

This disclosure relates in general to gaseous engines and generators, or more particularly, to gaseous engines and generators including a dual compressor turbocharger.

BACKGROUND

An internal combustion engine converts potential chemical energy in the form of a fuel into mechanical energy. Various fuels are available for internal combustion engines. Some recent developments have focused on alternatives to gasoline and other conventional fuels as efforts toward cleaner burning engines have gained momentum. Other types of fuels, such as gaseous fuels, provide numerous advantages over conventional fuels. Gaseous fuels may produce less emission. Gaseous fuels may cost less for the consumer. Gaseous fuels also present additional considerations in the design of internal combustion engines to optimize energy efficiency, exhaust production, and versatility.

Another area that improves the efficiency of the engine is turbocharging. A turbocharger for an engine increases the amount of air received by a combustion chamber of an engine. Increased air allows for increased fuel, which improves the engine's power. The turbocharger may be powered by the exhaust of the engine, which improves the engine's efficiency.

BRIEF DESCRIPTION OF THE DRAWINGS

Example implementations are described herein with reference to the following drawings.

DETAILED DESCRIPTION

A gaseous fuel engine may include one or more fuels under pressure such as liquefied petroleum gas (LPG), hydrogen gas, natural gas, biogas, or another gas. In some examples, the gaseous fuel is mixed with air under pressure, and the pressurized air and fuel mixture is delivered to one or more cylinders through an intake plenum or another passage. However, the air and fuel mixture is combustible. The distance that the combustible mixture travels and the areas exposed to the combustible mixture should be minimized. The following examples include separate compressors for air and fuel. Accordingly, the pressurized air travels separate from the pressurized fuel. The air and fuel are mixed near the combustion chamber of the engine, which reduces the components of the engine that include the combustible mixture and improves the safety of the engine.

Figure 1:
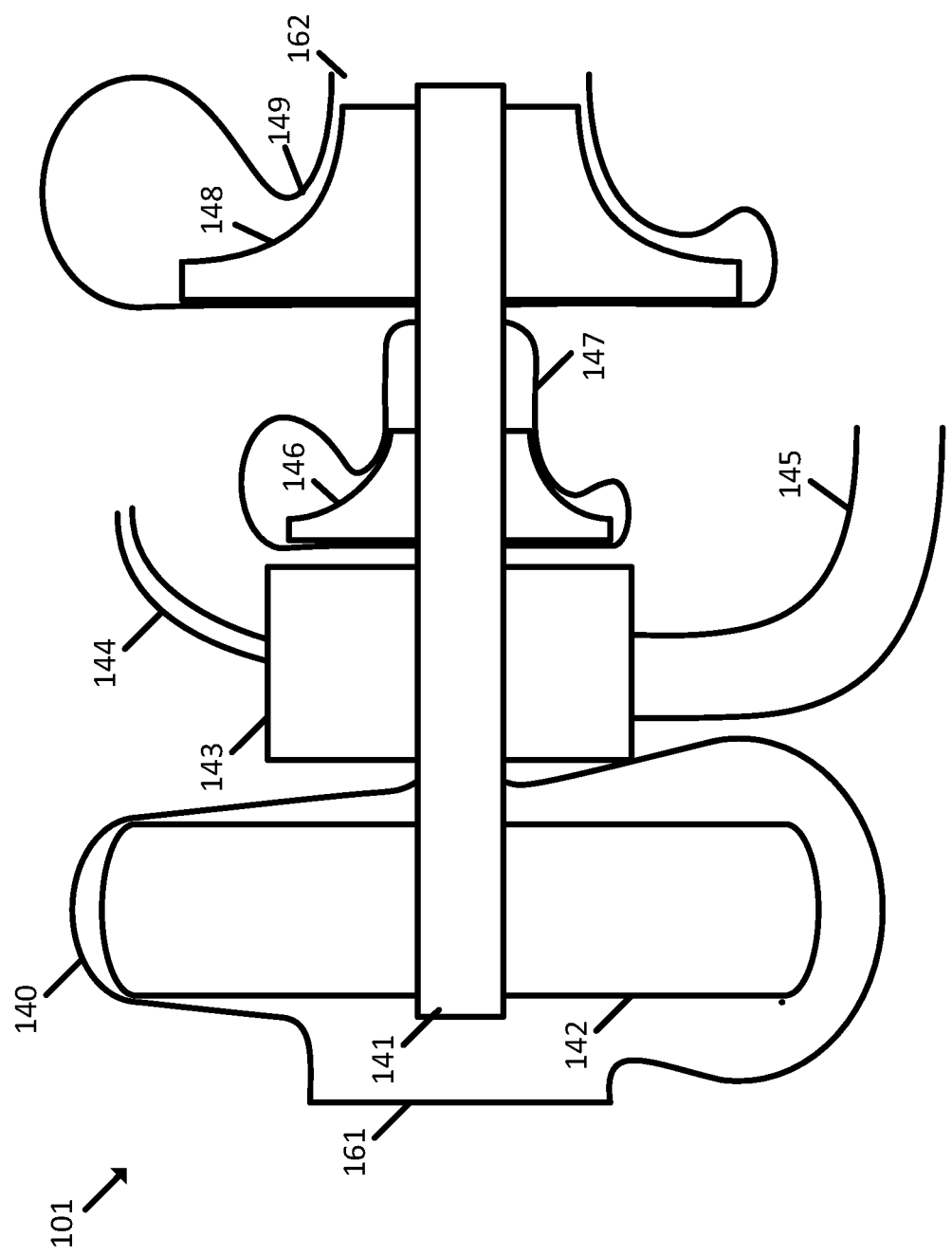
FIG. 1 illustrates an example dual compressor turbocharger.

FIG. 1 illustrates an example dual compressor turbocharger 101. The dual compressor turbocharger 101 includes a shaft 141, a turbine housing 140, a bearing assembly 143, a fuel compressor housing 147, and an air compressor hosing 149. The turbine housing 140 includes an exhaust inlet, an exhaust outlet 161, and a turbine wheel 142. The fuel compressor housing 147 includes a fuel compressor wheel 146, a fuel inlet, and a fuel outlet. The air compressor housing 149 includes an air compressor wheel 148, an air inlet 162, and an air outlet. The bearing assembly 143 includes an oil feed 144 and an oil return 145. The shaft 141 is coupled to the turbine wheel 142 and coupled to the air compressor wheel 148. The phrases "coupled with" or "coupled to" include directly connected to or indirectly connected through one or more intermediate components. Additional, different, or fewer components may be included.

Figure 2:
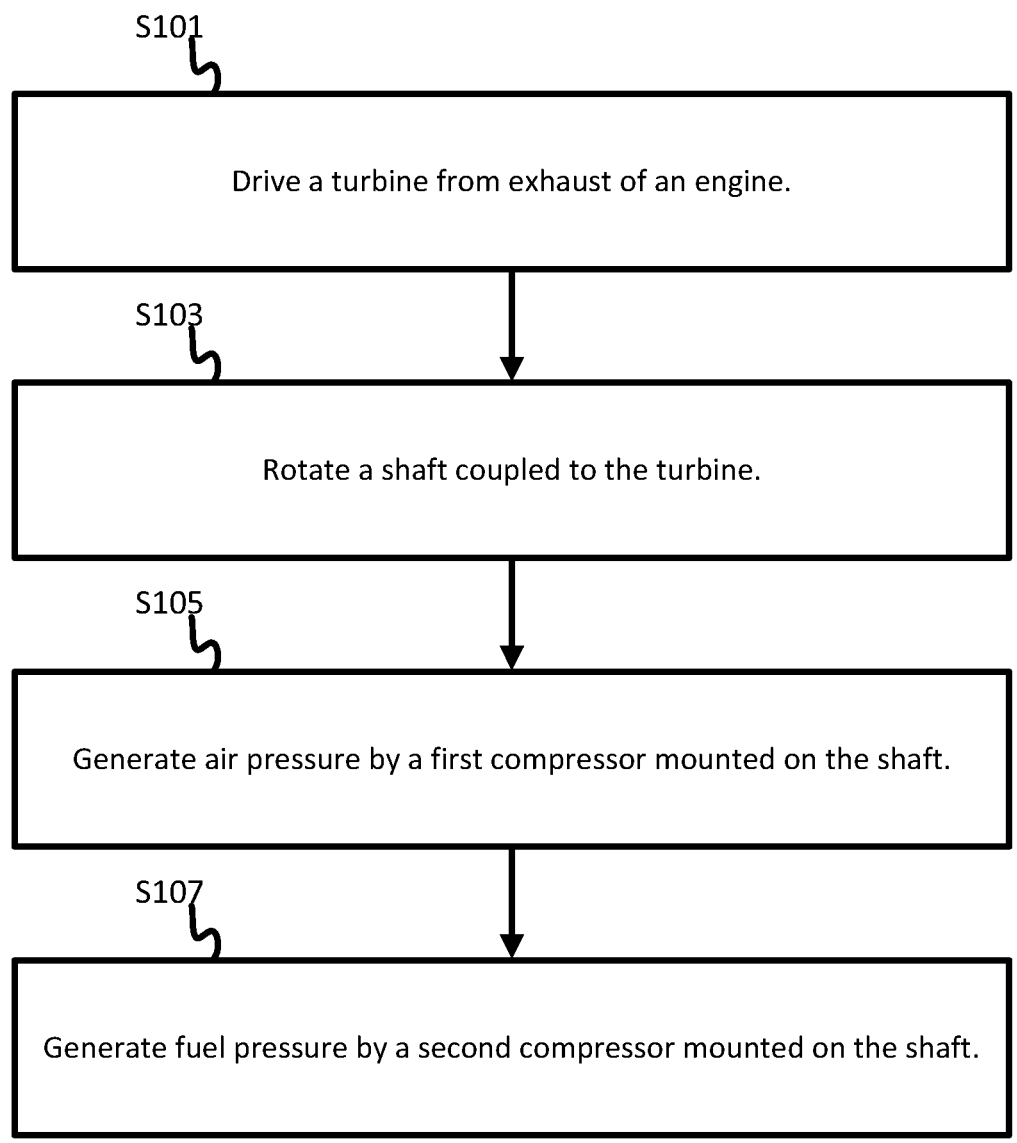
FIG. 2 illustrates an example flowchart for operating the dual compressor turbocharger.

FIG. 2 illustrates an example flowchart for operating the dual compressor turbocharger. Additional, different, or fewer acts may be provided. The acts may be performed in the order shown or other orders. The acts may also be repeated. The acts may be performed by any of the fuel delivery systems described above.

The dual compressor turbocharger 101 may be a component of a fuel and air delivery system, an internal combustion engine including the fuel and air delivery system, or a generator engine including the engine. In an engine, the down stroke of a piston pulls air through low pressure into the cylinder. The amount of air taken into the cylinder compared to the theoretical maximum amount of air that could be taking into the cylinder may be referred as volumetric efficiency. The turbocharger increases the volumetric efficiency of the engine by increasing the density of the air.

For example, exhaust gas from the engine flows into the exhaust inlet of the turbine housing 140 through an exhaust conduit. The movement of the exhaust gas drives the turbine wheel 142, as shown by act S101. Under the force of the exhaust gas, the turbine wheel 140 is coupled to the shaft 141 and rotates shaft 141, as shown by act S103. The exhaust gas leaves the turbine housing 140 through the exhaust outlet 161.

The rotation of shaft 141 is facilitated by bearing assembly 143. The bearing assembly 143 may include a sleeve bearing that supports the shaft 141 and allows the shaft 141 to rotate in a frictionless or near frictionless on an oil coating. The oil may be continuously or semi-continuously fed to the bearing assembly 143. In one example, semi-continuously means at intervals based on time or the operation of the engine. The oil enters the bearing assembly 143 through an oil feed 144 that delivers the oil from the engine block. The oil feed 144 may be a pipe or tubing. The pipe or tubing may be formed of metal, plastic, or rubber. The oil return 145 is another metal pipe or rubber tubing that returns oil from the bearing assembly 143 to the oil pan of the engine.

The shaft 141 is also coupled to the fuel compressor wheel 146 and the air compressor wheel 148. Air may be drawn in axially into the air compressor housing 149, accelerated by the air compressor wheel 148 under the force of the shaft 141 and expelled radially from the air compressor housing 149. The air compressor wheel 148 may be a centrifugal pump that draws ambient air in through the air inlet 162 and spins the air through an arrangement of blades before expelling the air outward and through the an air outlet to the intake manifold of the engine. Thus, air pressure is generated by the air compressor mounted on the shaft 141, as shown by act S105.

Gaseous fuel may be drawn in axially into the fuel compressor housing 147, accelerated by the fuel compressor wheel 146 under the force of the shaft 141 and expelled radially from the fuel compressor housing 147. The fuel compressor wheel 146 may be a centrifugal pump that draws in gaseous fuel through the fuel inlet, spins the gaseous fuel through an arrangement of blades before expelling the gaseous fuel through the fuel outlet to the fuel supply rail of the engine. Thus, fuel pressure is generated by the fuel compressor mounted on the shaft 141, as shown by act S107. The air from and fuel are not mixed within the turbocharger.

The fuel compressor wheel 146 and the air compressor wheel 148 may be sized differently such that a capacity of the first compressor is greater than a capacity of the second compressor. In one example, the fuel compressor wheel 146 and the air compressor wheel 148 have different diameters. The diameter of the fuel compressor wheel 146 may be less than the diameter of the air compressor wheel 148. The ratio of the diameter of the fuel compressor wheel 146 to the diameter of the air compressor wheel 148 may be in the range of 1 to 2 (e.g., 1.1 or 1.3).

In another example, the diameter of the fuel compressor wheel 146 is about the same as the diameter of the air compressor wheel 148, but the arrangement of blades is different. The fuel compressor wheel 146 may include smaller vanes than the air compressor wheel 148. The fuel compressor wheel 146 may include narrower spaces between vanes than the air compressor wheel 148. The fuel compressor wheel 146 may include shallower vanes than the air compressor wheel 148. Thus, the width of the air compressor is greater than the width of the fuel compressor.

The relative sizes of the air compressor and fuel compressor, or the fuel compressor wheel 146 and the air compressor wheel 148, may be based on the air to fuel ratio of the engine. For example, the ratio of the air compressor wheel 148 to the fuel compressor wheel 146 may be proportional to the desired air to fuel ratio. Alternatively, a ratio of the volumes of the air compressor wheel 148 to the fuel compressor wheel 146 may be proportional to the desired air to fuel ratio. The different volumes of the air compressor wheel 148 and the fuel compressor wheel 146 cause the fuel that is delivered to the engine to be at a different pressure than the air that is delivered to the engine.

The dual compressor turbocharger 101 includes two centrifugal compressors but may be considered a single stage compressor as both compressors operate at the same time. In other words, in one example, the dual compressor turbocharger 101 may not include successive stage such as first stage in which air is compressed and a second stage in which the air and fuel mixture are compressed.

Figure 3:
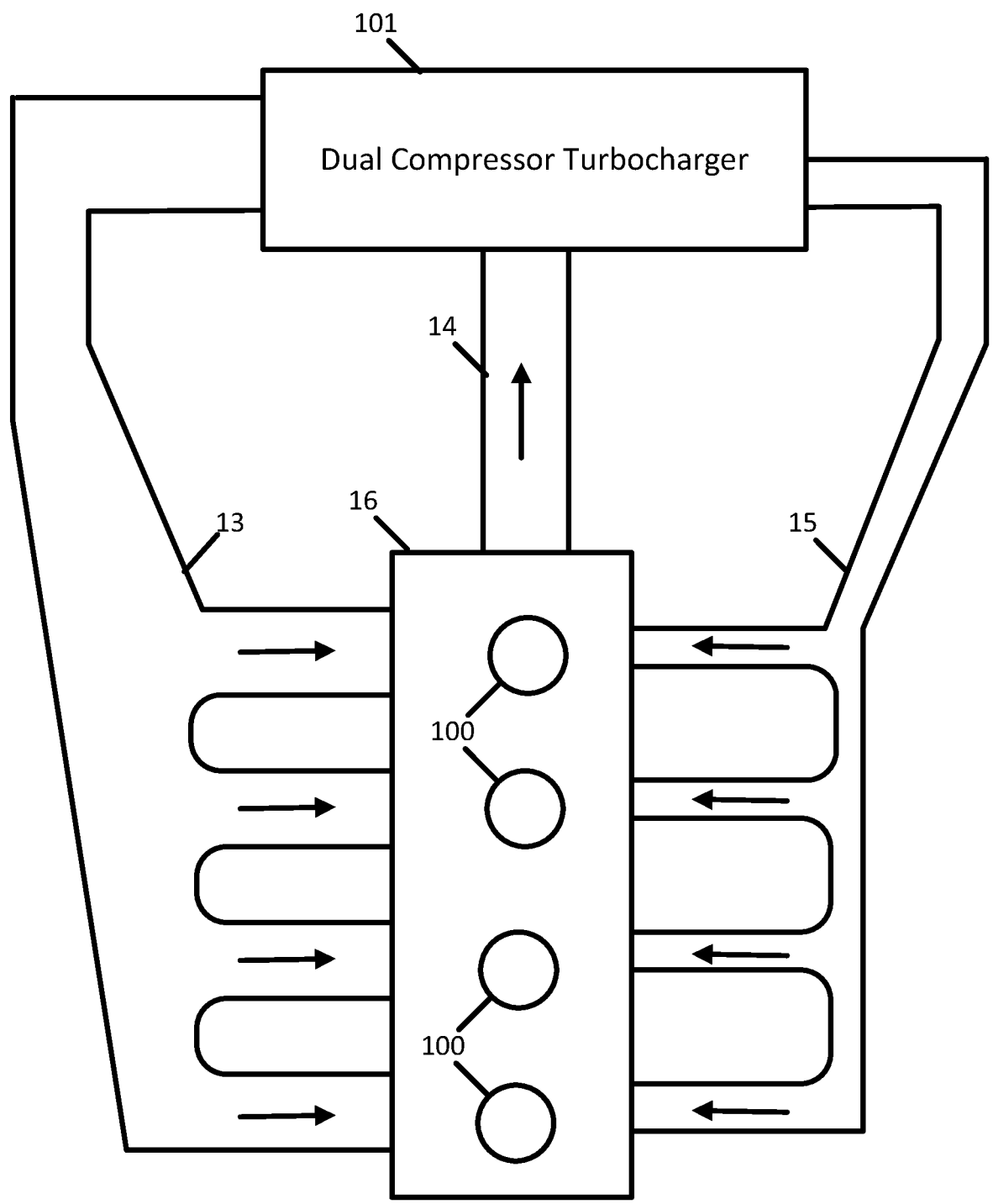
FIG. 3 illustrates an example engine including a dual compressor turbocharger.

FIG. 3 illustrates an example engine including the dual compressor turbocharger 101, an air intake manifold 13, a fuel supply rail 15, an exhaust conduit 14, and an engine block 16 including one or more cylinders 100. Additional, different, or fewer components may be included in the engine.

The air outlet of the air compressor of the dual compressor turbocharger 101 expels pressurized air to the air intake manifold 13. The fuel outlet of the fuel compressor of the dual compressor turbocharger 101 expels pressurized fuel to the fuel supply rail 15. The pressure of the fuel in the fuel supply rail 15 may be higher than the pressure of the air in the air intake manifold 13.

The air intake manifold 13 and the fuel supply rail 15 meet near each of the one or more cylinders 100. The air from the air compressor and fuel from the fuel compressor may be mixed downstream of the turbocharger and just upstream of the engine. Alternatively, the air and fuel may be mixed at the engine.

The passages of the air intake manifold 13 may be larger in dimension that the passages of the fuel supply rail 15. For example, the individual portions of the air intake 13 for each cylinder may be sized at a diameter larger than diameters the individual fuel lines of the fuel supply rail.

The exhaust conduit 14 receives exhaust gas from the engine including heat and byproducts of the combustion that occurs in the cylinder. The exhaust gas is blown from the cylinder under pressure. The exhaust conduit 14 carries exhaust from the engine back to the dual compressor turbocharger 101.

Figure 4:
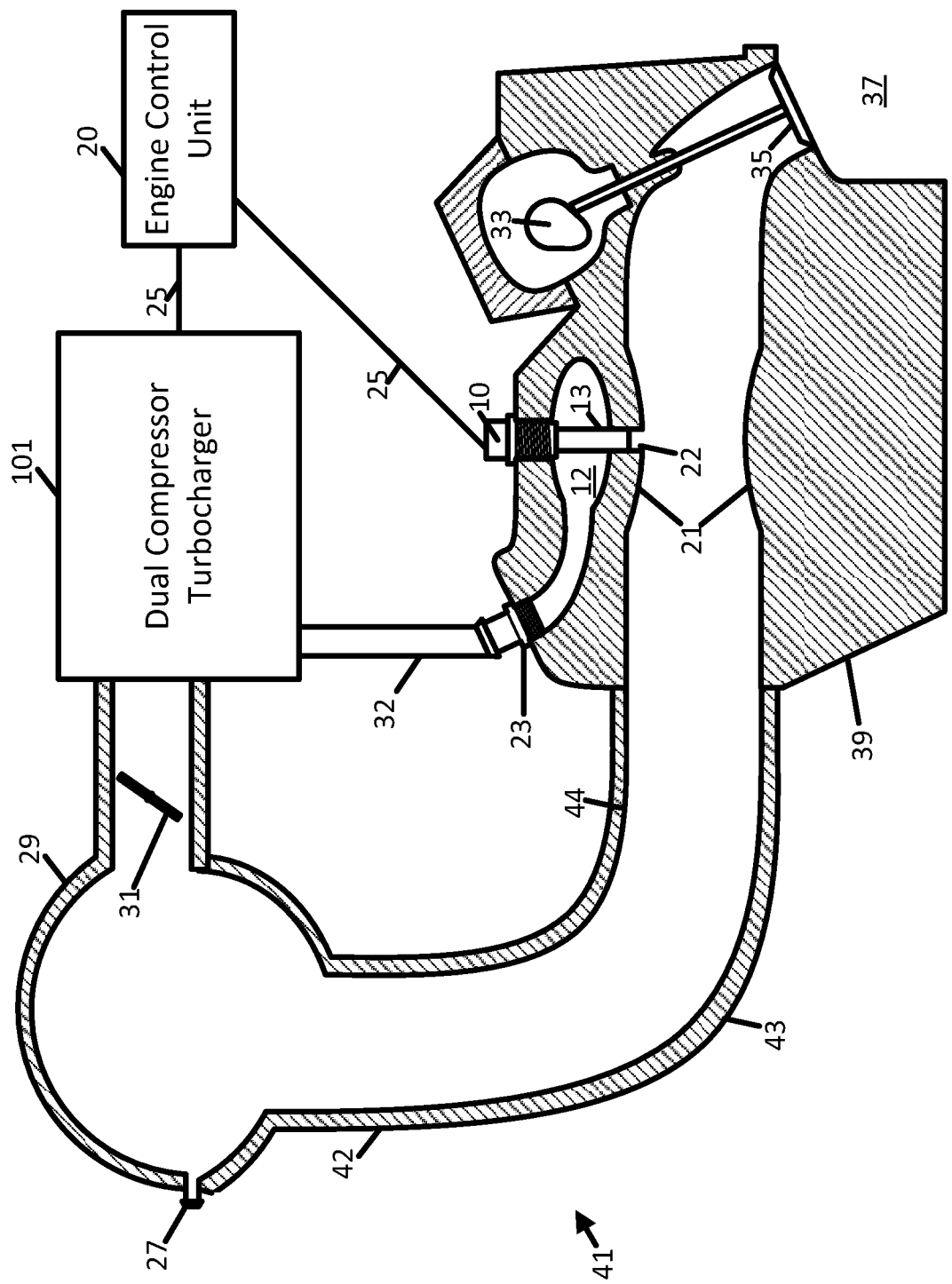
FIG. 4 illustrates an example engine including a dual compressor turbocharger.

FIG. 4 illustrates an example engine including a dual compressor turbocharger 101. The engine may include an intake manifold 41, a plenum 29, a manifold sensor array 27, a throttle device 31, a fuel supply rail 32, a fuel inlet 23, a cylinder head 39, a camshaft 33, an intake valve 35, a fuel injector 10, a plunger 13, and a venturi passage 21. The intake manifold 41 may include a first portion 42, which may be vertical, a second portion 44, which may be horizontal, and a third portion 43, which may be curved and may connect the first portion 42 and the second portion 44. The fuel delivery system is coupled with a combustion chamber 37. Additional, different, or fewer components may be provided.

The engine may be a single cylinder engine or a multiple cylinder engine. In one example of a multiple cylinder engine, a different fuel injector 10 and venturi passage 21 are included for each cylinder. In another example, multiple cylinders share a common fuel injector 10 and/or venturi passage 21.

An engine control unit (ECU) 20 is connected to the fuel injector 10 and the dual compressor turbocharger 101 via control wiring 25. The ECU 20 may control the actuation of the fuel injector 10 and activate and deactivate the dual compressor turbocharger 101. The dual compressor turbocharger 101 may be activated in response to the throttle device 31.

The throttle device 31 regulates the flow of air into the intake manifold 41 from the dual compressor turbocharger 101. The throttle device 31 may be a butterfly valve shaped as a disk. The throttle device 31 may be a throttle valve driven by an accelerator pedal, a throttle lever, or a signal from the ECU 20. The throttle device 31 may extend to the walls of the intake manifold 41. That is, the radius of a disk of the throttle device 31 may be slightly smaller than the radius of the intake manifold. Alternatively, the throttle device 31 may be spaced apart from the intake manifold 41 such that some air can always flow around the throttle device 31. The throttle device 31 may be positioned as shown. Alternatively, the throttle device 31 may be positioned within the plenum 29 or farther downstream in the intake manifold 41.

The plenum 29 may be shaped to control the pressure of the air in the intake manifold. The plenum 29 may allow an accurate reading to be detected by a pressure sensor (e.g., barometric sensor). The pressure sensor may include a transducer that produce a pressure signal as a function of pressure imposed on the transducer. The manifold sensor array 27 may include one or more pressure sensors. The manifold sensor array 27 may also include a thermometer or an air flow meter. The manifold sensor array 27 may generate an input signal for the ECU 20.

The manifold sensor array 27 may also include a throttle sensor in the position shown in FIG. 4 or in a position adjacent or near the throttle device 31. The throttle sensor may generate an input signal based on a position of the throttle device 31. The ECU 20 may generate a turbocharger start signal to turn on the dual compressor turbocharger 101. The start signal may be based on the throttle device 31, an accelerator pedal, or a throttle lever. In one example, the dual compressor turbocharger 101 is always activated and begins to spin in response to a sufficient amount of exhaust gas being supplied by the engine.

In addition, the ECU 20 may generate a fuel injector drive signal based on an input signal generated by manifold sensor array 27. For example, as more air is allowed into the intake manifold 41, the ECU 20 instructs the fuel injector 10 to release more fuel according to the specified air to fuel ratio.

The intake manifold 41 includes the first portion 42, the second portion 44, and the third portion 43. The intake manifold 41 may alternatively be substantially vertical or substantially horizontal without a curved portion. One or more of the sensors in the in the manifold sensor array 27 may be mounted in the first portion 42, the second portion 44, or the third portion 43. In one example, a separate pressure sensor is mounted in each of the first portion 42, the second portion 44, and the third portion 43. Other arrangements of pressure sensors, temperature sensors, throttle sensors, and/or flow meters may be used.

The intake manifold 41 may be coupled with and/or formed integrally with the cylinder head 39 that is adjacent to the cylinder. The intake manifold 41 and/or the cylinder head may form an intake flow component to mix a flow of air and a flow of gaseous fuel. The cylinder head 39 also forms the combustion chamber 37. The camshaft 33 rotates to open and close the intake valve 35 to release the air and fuel mixture into the combustion chamber 37. The fuel inlet 23 may receive fuel from a fuel supply path to fill the fuel chamber 12.

The venturi passage 21 may be coupled with an injection port 22. When pressure within the venturi passage 21 drops to a specific level and the plunger 13 is in a position to connect the fuel chamber 12 and the venturi passage 21, fuel is drawn through the injection port 22. The location of the injection port 22 impacts that amount of time for the air and fuel mixture to reach the combustion chamber 37. An example range of distances from the combustion chamber 37 to the injection port 22 may be 2-10 centimeters. Arrangements where the injection port is near the throttle device 31 or upstream of the throttle device 31 may start slower and respond less quickly than arrangements in which the injection port 22 is near the combustion chamber 37. Other variations are possible.

The fuel chamber 12 may be a hermetically sealed chamber to enclose a gaseous fuel. The gaseous fuel may be liquefied petroleum gas (LPG), hydrogen gas, natural gas, biogas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the engine. Natural gas (e.g., compressed natural gas (CNG)) may be a hydrocarbon gas mixture. Biogas may be a gas produced by the breakdown of organic material. The fuel chamber 12 may store the gaseous fuel at a pressure received from the dual compressor turbocharger 101.

The plunger 13 may be selectively connected to and disconnected from the fuel chamber 12 and the venturi passage 21. The connection or disconnection of the plunger 13 may control the flow of the gaseous fuel into the venturi passage 21 and ultimately to the combustion chamber of the engine, which may be downstream of the venturi passage 21 with respect to the flow of the air (or the air and fuel mixture). Because the injection point of the fuel may be downstream of the throttle and closer to the combustion chamber of the cylinder, the flow of fuel can be controlled with a quicker response time. The quicker response time also provides a quicker start time for the engine. In other words, the air and fuel mixture is only downstream of the venturi passage 21, which is near the combustion chamber. Thus, the flow of air that is upstream of the venturi passage 14 includes no gaseous fuel, or to the extent some gaseous fuel is present upstream of the venturi passage 21, the fuel level in the air is below a minimum level. The minimum level may be a level low enough to prevent combustion of the gaseous fuel. Alternatively, the minimum level may be low enough to prevent detection. Other example minimum levels are possible.

In an example not illustrated, the gaseous fuel may flow through the fuel injector 10 such that the fuel injector nozzle is the injection point for the gaseous fuel. In this example, the fuel injector 10 may include a pintle nozzle including a tapered pintle, a disk nozzle having a flat disk with holes that are arranged to define the size of the spray of the fuel injector, or a ball and socket nozzle. Internally, the fuel injector 10 may include a seal (e.g., O-ring) between the fuel injector and the fuel supply rail 32, a filter to prevent debris from clogging the fuel injector, and a coil winding to apply a magnetic field to the plunger 13 to move the plunger 13. When the gaseous fuel flows through the fuel injector 10, the venturi surface 15 provides the driving force for the flow of gaseous fuel.

As an alternative, the fuel injector 10 may be replaced with another type of solenoid. The solenoid may include a rod to selectively connect and disconnect the fuel chamber 12 and the venturi passage 14 without fuel flowing through the solenoid. The plunger 13 may be partially exposed outside of the casing of the fuel injector 10 even when disengaged, as shown in FIG. 4. Alternatively, the plunger 13 may be contained within the fuel injector 10 when in the disengaged state. The solenoid or the fuel injector 10 may include a spring to bias the plunger 13 in a closed position and a coil that, when energized with an electrical current, moves the plunger 13. In other examples, the spring or coil may bias the plunger 13 in an open position.

The air and fuel delivery system may be part of, or used in or with, an engine or engine-generator. Various other systems may be included in the engine or the engine-generator, which include but are not limited to a cooling system, a lubrication system, an exhaust system, and an electrical system. For example, the fuel injector 10 may be powered by an electrical power source (e.g., a battery, a battery charging alternator). The engine-generator may include an alternator for converting the mechanical energy produced by the engine to an alternating current.

Figure 5A:
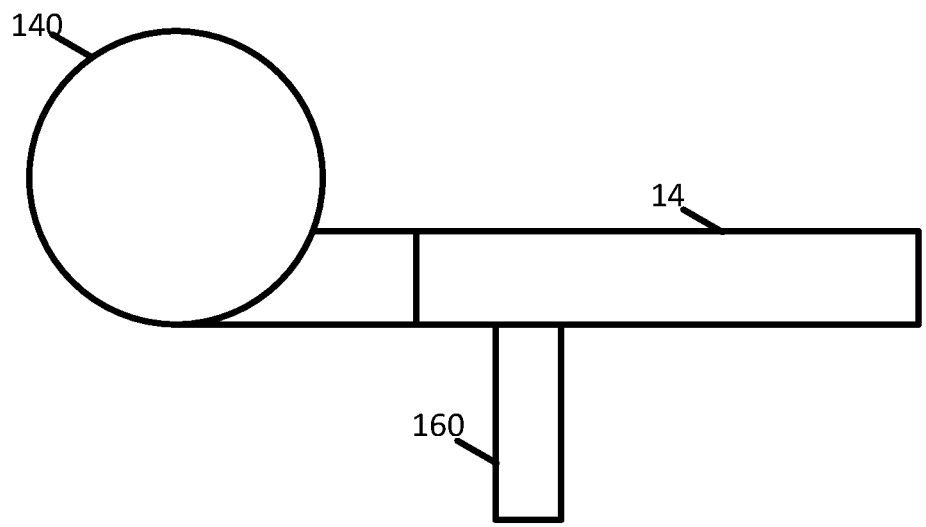
FIG. 5A illustrates an example turbocharger intake.

FIG. 5A illustrates an example turbocharger intake. The air intake of the turbine assembly 140 of the dual compressor turbocharger 101 is coupled to the exhaust conduit 14. The exhaust conduit 14 is coupled to a wastegate 160. The wastegate 160 provide a secondary path for the exhaust gas to bypass the dual compressor turbocharger 101. The wastegate 160 controls the speed of the turbine wheel 142. The wastegate 160 may controlled by ECU 20 or automatically through a mechanism that operates based on the pressure in the exhaust conduit 14. By opening and closing the wastegate 160, the pressures of fuel and air are regulated.

Figure 5B:
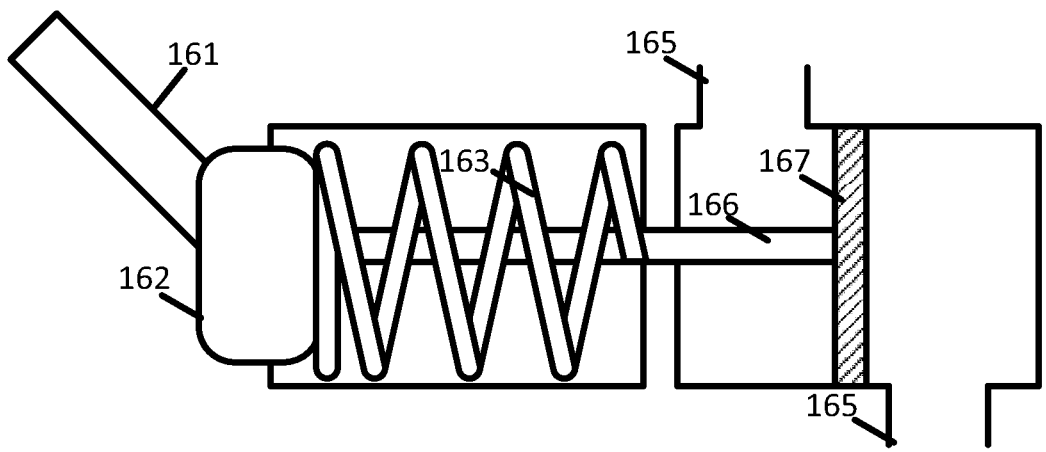
FIGS. 5B and 5C illustrate example wastegates for the dual compressor turbocharger.
Figure 5C:
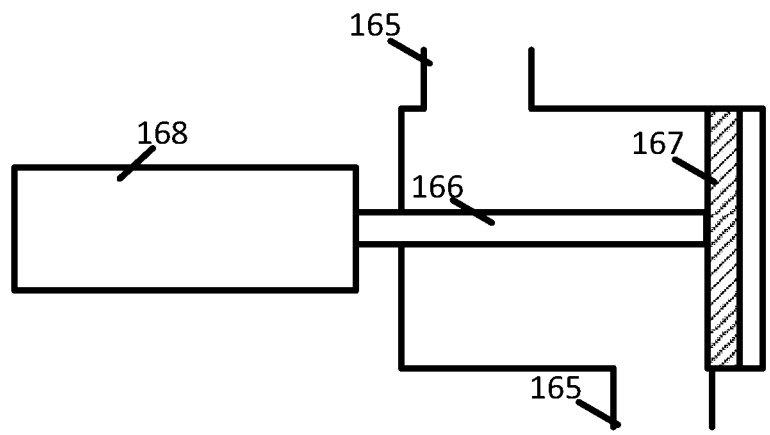

FIGS. 5B and 5C illustrate example wastegates for the dual compressor turbocharger. In FIG. 5B, the wastegate 160 includes an input tube 161, a diaphragm 162, a spring 163, ports 165, a rod 166, and a plunger 167. Pressure from the exhaust conduit 14 may be received through the input tube 161. When the pressure in the input tube 161 exceeds a predetermined value or range, the diaphragm 162 expands against the force of spring 163 to move rod 166 and plunger 167. In a deactivated position, as shown in FIG. 5B, the plunger 167 prevents air flow between the ports 165. In an activated position, when the plunger 167 is moved, the ports 165 are opened to allow air to flow in a bypass path circumventing the dual compressor turbocharger 101. One of the ports 165 is an inlet and the other of the ports 165 is an outlet. In one alternative, the pressure in tube 161 is from the fuel supply rail or the air intake manifold.

In FIG. 5C, the wastegate is controlled electronically from a drive signal generated at the ECU 20. The drive signal causes the solenoid 168 to move the rod 166 and the plunger 167 to open and close the ports 165. The ECU 20 may generate the drive signal for the wastegate based on a pressure measurement. In one example, the pressure measurement is taken by a sensor in the exhaust conduit 14. In another example, the pressure measurement is taken by a sensor in the fuel supply rail or the air intake manifold. The ECU 20 may generate the drive signal for the wastegate based on the throttle device 31 or a user input from a throttle level or accelerator. Alternatively, the engine may include a turbo switch that allows the user to turn the dual compressor turbocharger 101 on and off by activating and deactivating the wastegate.

Figure 6:
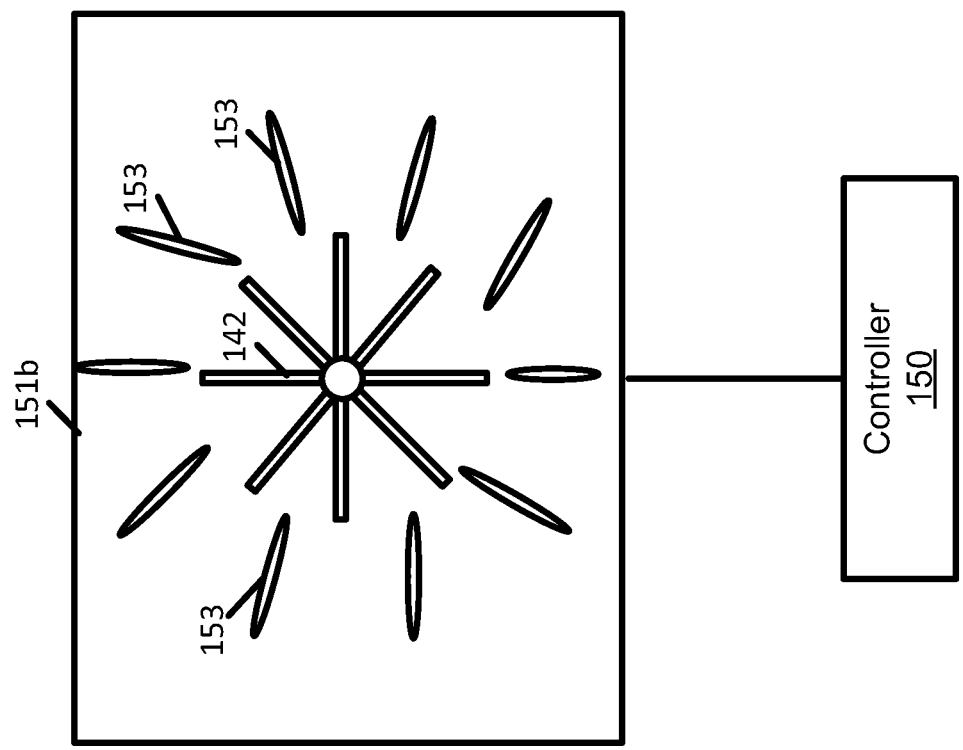
FIG. 6 illustrates example variable geometry for a dual compressor turbocharger.
Figure 6:
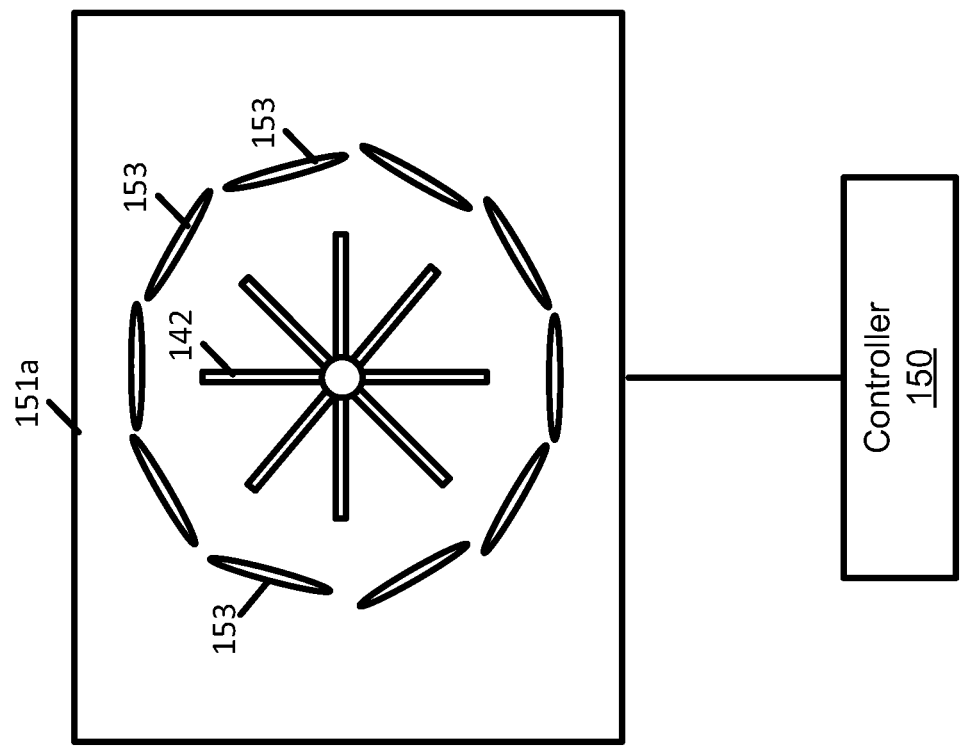

FIG. 6 illustrates example variable geometry for a dual compressor turbocharger. The variable geometry includes movable blades 153. The variable geometry may be applied to the turbine wheel 142. The movable blades 153 choke the vanes of the turbine wheel 142. In a closed state 151a, the movable blades 153 limit the flow of air to the turbine wheel 142. In an open state 151b, the movable blades 153 allow more air to the turbine wheel 142. The movable blades 153 may be driven by a motor or solenoid individual or as a group.

The controller 150 (e.g., ECU 20) may generate a drive signal for the variable geometry. The drive signal for the variable geometry may be based on a pressure measurement. In one example, the pressure measurement is taken by a sensor in the exhaust conduit 14. In another example, the pressure measurement is taken by a sensor in the fuel supply rail or the air intake manifold. The controller 150 may generate the drive signal for the variable geometry based on the throttle device 31 or a user input from a throttle level or accelerator. Alternatively, the engine may include a turbo switch that allows the user to turn the dual compressor turbocharger 101 on and off by activating and deactivating the variable geometry.

The controller 150 or ECU 20 may control the wastegate and the variable geometry in combination according to an efficiency curve for the dual compressor turbocharger 101. The output (fuel pressure and air pressure) of the dual compressor turbocharger 101 may decrease when the speed of the turbine wheel 142 exceeds a certain level. The ECU 20 may store the efficiency curve as associated pairs of wastegate settings and variable geometry settings.

Figure 7:
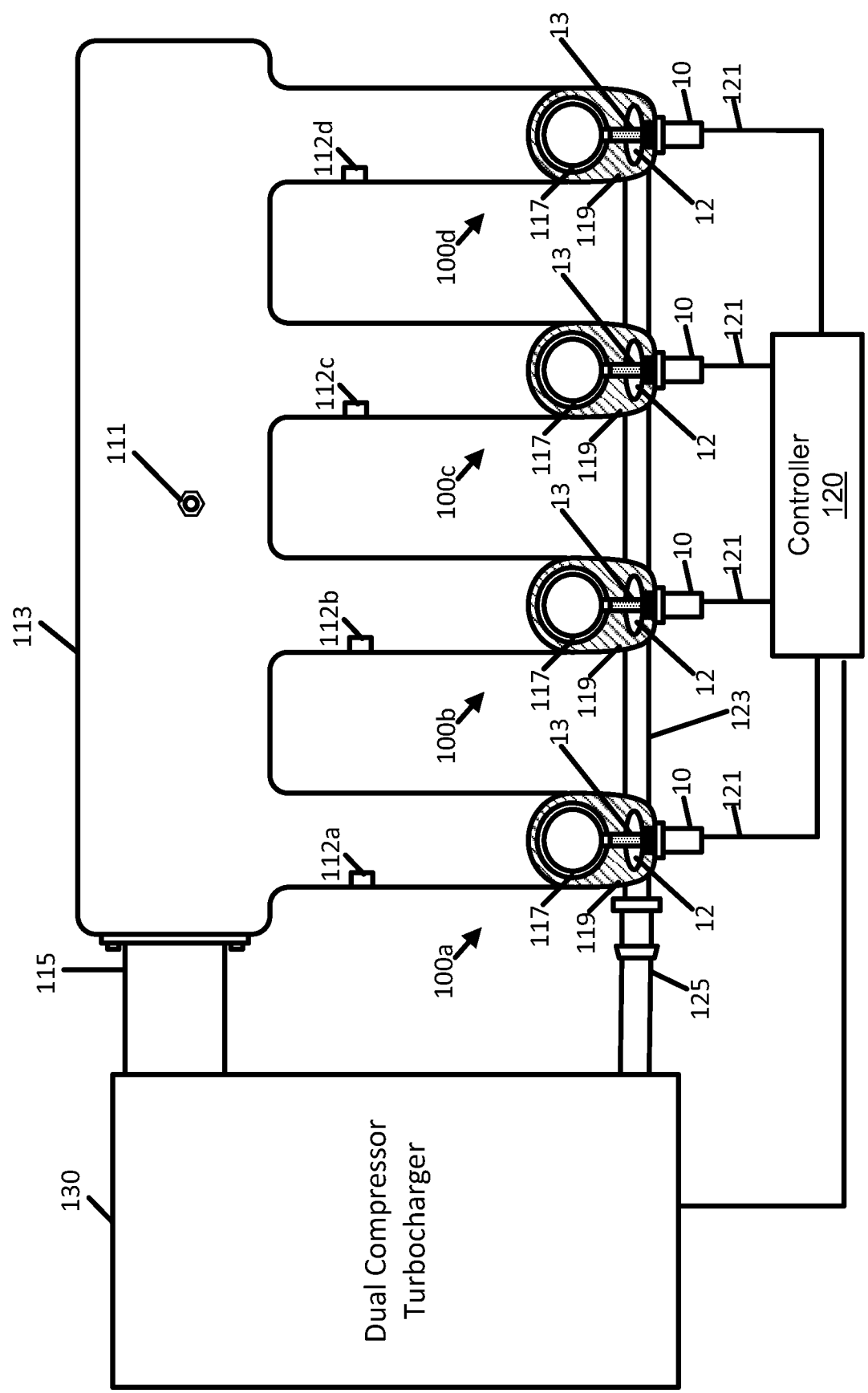
FIG. 7 illustrates an example engine including a dual compressor turbocharger.

FIG. 7 illustrates an example multi-cylinder engine including a dual compressor turbocharger 130. The multi-cylinder engine may include multiple cylinders 100a-d. Example numbers of cylinders include 2, 4, 6, and 8, though any number of cylinders may be possible. The multi-cylinder engine may include an intake manifold 113, an air intake 115, a fuel supply 125, a fuel rail 123, a manifold sensor 111, cylinder sensors 112a-d and a controller 120. Each cylinder 100a-d may include a fuel injector 10, a plunger 13, a fuel chamber 12, a venturi passage 117, a fuel delivery chassis 119, and a communication line 121. Additional, different, or fewer components may be provided. For example, multiple cylinders may be coupled to the same fuel delivery system. The multiple cylinders may share a controller but each includes a separate fuel injector. Alternatively, the multiple cylinders may share a single fuel chamber and/or a single plunger.

The dual compressor turbocharger 130 includes a turbine driven by exhaust of the internal combustion engine and a shaft coupled to the turbine. A first compressor is mounted on the shaft and has a first inlet coupled to an air supply and a first outlet coupled to the air intake 115. A second compressor is mounted on the shaft and has a second inlet coupled to a fuel supply and a second outlet coupled to the fuel supply 125.

The controller 120 may generate one or more drive signals for the dual compressor turbocharger 130 and or for injecting fuel into the cylinders 100a-d. The one or more drive signals may activate or deactivate the dual compressor turbocharger 130, activate or deactivate a wastegate for bypassing exhaust gas around the dual compressor turbocharger 130, or control variable geometry formations that change the speed of the dual compressor turbocharger 130.

In one example, a single drive signal is used that controls both the dual compressor turbocharger 130 and the fuel injection. In another example, separate drive signals may be used. In one example, separate drive signals are sent to individual cylinders. The separate drive signals may specify different duty cycles and/or air to fuel ratios. For example, each cylinder may have a different ideal air to fuel ratio based on measured performance or physical characteristics of the cylinder.

In addition or in the alternative, each cylinder may be associated with a cylinder sensor 112a-d. The cylinder sensor 112a-d may be any combination of a pressure sensor, an air to fuel ratio sensor, a temperature sensor or a flow meter. Therefore, the controller 120 may specifically tailor the drive signal for each cylinder according to the airflow in the portion of the chamber leading to the cylinder, the air to fuel ratio in the airflow in the portion of the chamber leading to the cylinder, and/or the temperature of the chamber leading to the cylinder. The controller 120 may generate a duty cycle for the drive signal for each cylinder according to the sensor data.

The controller 120 may be part of the ECU 20. The ECU 20, controller 120, and controller 150 may include at least a memory, a communication interface, and a processor. The ECU 20 may generate a drive signal for the fuel injector 10.

In one example, the operation of the fuel injector 10 and plunger 13 may be digital. The fuel injector 10 may be either on or off. In this example, the drive signal may be a square wave. A high level (e.g., 5 volts, 12 volts, or 24 volts) of the square wave may correspond to the disengaged state of the plunger 13 to open the flow of the gaseous fuel into the venturi passage 14. A low level (e.g., −5 volts, −12 volts, or 0 volts) of the square wave may correspond to the engaged state of the plunger 13 to close the flow of gaseous flow.

In another example, the operation of the fuel injector 10 and plunger 13 may be variable. That is multiple positions of the plunger 13 between the engaged state and the disengaged state. The plunger 13 may be separate from a passage 19 by a distance that may vary between 0 and the width of the fuel chamber 12 at the position of the plunger 13. The drive signal may be proportional to the desired vale for the distance. Example maximum values for the distance include 1 millimeter, 5 millimeters, 1 centimeter or another value. Example voltage ranges that correspond to the variable distance include −12 volts to 12 volts and 0 to 5 volts. The drive signal may be digital and include a pulse train, a bit stream or discrete values. The digital signal may include data specifying the desired distance.

The ECU may generate the drive signal according to a pressure in the manifold. The pressure may be measured in the venturi passage 14 or upstream of the venturi passage 14. The pressure may be measured by a manifold pressure sensor. As the pressure sensor indicates an increase in pressure, more air arrives at the venturi passage 14, and more gaseous fuel is released by the fuel injector 10. Conversely, as the pressure sensor indicates a decrease in pressure, less air arrives at the venturi passage 14, and less gaseous fuel is released by the fuel injector 10.

In addition or in the alternative, the ECU 20 may generate the drive signal according to an air to fuel ratio. The air to fuel ratio may be a mass ratio. The air to fuel ratio may be selected so that exactly, or substantially exactly, enough fuel is provided to completely burn the amount of air that is provided, or vice versa.

For example, the ECU 20 may select the air to fuel ratio using stoichiometry and the chemical makeup of the gaseous fuels. The memory of the ECU 20 may include a lookup table of gaseous fuels associated with ideal air to fuel ratios. Example fuel ratios (mass of air:mass of fuel) may include 10, 12, 14, 16, 20 and 30. The lookup table may include a low air to fuel ratio (rich mixture), a medium air to fuel ratio, and a high air to fuel ratio (lean mixture). In one example, the low air to fuel ratio is associated with natural gas, the medium air to fuel ratio is associated with propane, and a high air to fuel ratio is associated with hydrogen. The rich and lean distinction may also be with respect to the theoretical, stoichiometric or chemically ideal amount needed for combustion with a given amount of air. In addition or in the alternative to mass, the air to fuel ratio may be a volumetric ratio of the volume of air to the volume of fuel.

Alternatively, the ECU 20 may calculate the desired air to fuel ratio. The air to fuel ratio may be calculated and/or adjusted based one or more of the type of gaseous fuel, temperatures (such as ambient temperature or engine temperature), and/or pressure outside of the engine. During operation of the engine, the air to fuel ratio may be changed as a function of the pressure in the manifold of the engine as determined from an input signal, which is discussed in more detail below. Other variations are possible.

The ECU 20 may include a feedback loop to control the air to fuel ratio. The ECU 20 may be coupled to an air to fuel ratio (AFR) sensor or another type of oxygen sensor. The AFR sensor may generate an output voltage based on detected oxygen levels. The AFR sensor may be mounted in a specialized monitoring chamber, an exhaust passage, or in the intake passage. The AFR sensor may include a voltage generation material, such as titanium, zirconium, or another material. The voltage generation material may generate a voltage in response to oxygen levels present at the sensor or change resistance as a function of oxygen levels present at the sensor. Alternatively, a mass air flow sensor may be used.

The ECU may receive the output voltage from the AFR sensor and compare the output voltage or the air to fuel ratio associated with the output voltage to a threshold value. When the air to fuel ratio exceeds the threshold, the air to fuel mixture may be too lean. Accordingly, the ECU 20 may disengage the plunger 13 or increase the duty cycle for the plunger 13 in order to release some or more of the gaseous fuel from the fuel chamber 12 under a force from low pressure in the venturi passage 14. When the air to fuel ratio is less than the threshold, the air to fuel mixture is too rich. Accordingly, the ECU 20 may engage the plunger 13 or decrease the duty cycle for the plunger to reduce, limit, or stop the flow of gaseous fuel into the venturi passage. The threshold may be a function of one or more of the type of gaseous fuel, ambient conditions, and a user configuration.

The ECU 20 may also control other functions of the gaseous engine. The ECU 20 may generate an ignition control signal for timing the electric spark for initiating combustion in the combustion chamber of one or more cylinders. The ECU 20 may generate control signals for idle speed control, emission control, coolant control, valve control or other functions.

Figure 8:
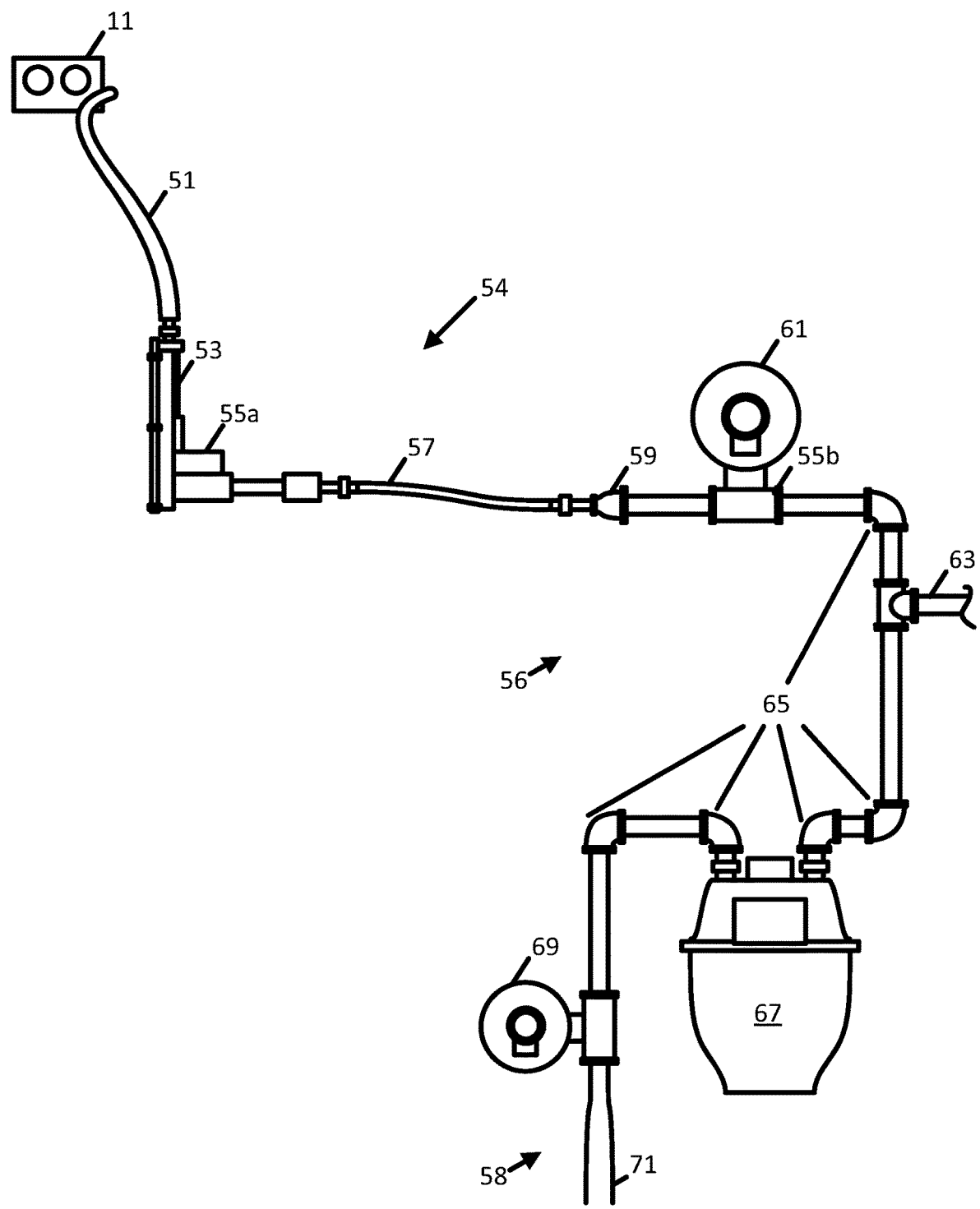
FIG. 8 illustrates an example fuel supply path.

FIG. 8 illustrates an example fuel supply path. The fuel supply path may be coupled to the chassis 11 of the fuel delivery system. The fuel supply path may include an engine fuel supply line 51, a demand regulator 53, a low pressure supply section 54, a medium pressure supply section 56, and a high pressure supply section 58. The low pressure supply section 54 is bounded by a first joint 55a and a second joint 55b and may include a flexible coupling 57, a secondary regulator 61 and a reducer 59. The medium pressure supply section 56 includes one or more elbow connections 65, a meter 67, and a primary regulator 69. The high pressure supply section 58 includes a supply line 71 and upstream portions of the supply path to the utility provider. Another connection 63 may lead to a home or another device that uses the gaseous fuel. Additional, different, or fewer components may be provided. For example, only one regulator may be used.

The primary regulator 60 and the secondary regulator 61 are pressure regulators to control the fuel supply and/or decompress the gaseous fuel stored at high pressure. The pressure regulators supply the gaseous fuel to the dual compressor turbocharger 101. Any of the pressure regulators may be electronic and receive a control signal from the ECU 20. In electronic pressure regulators, the specific pressure may be controlled by a setting made through a control panel or the ECU 20. Any of the pressure regulators may be mechanical and include a diaphragm that is pushed against a spring to open and close a valve of a regulating orifice. In mechanical pressure regulators, the specific pressure may be controller by a manual dial, dip switch, or an adjustment handle. Example pressures at the primary regulator 60 and the secondary regulator 61 may include 5 psi, 10 psi, or 100 psi.

Figure 9:
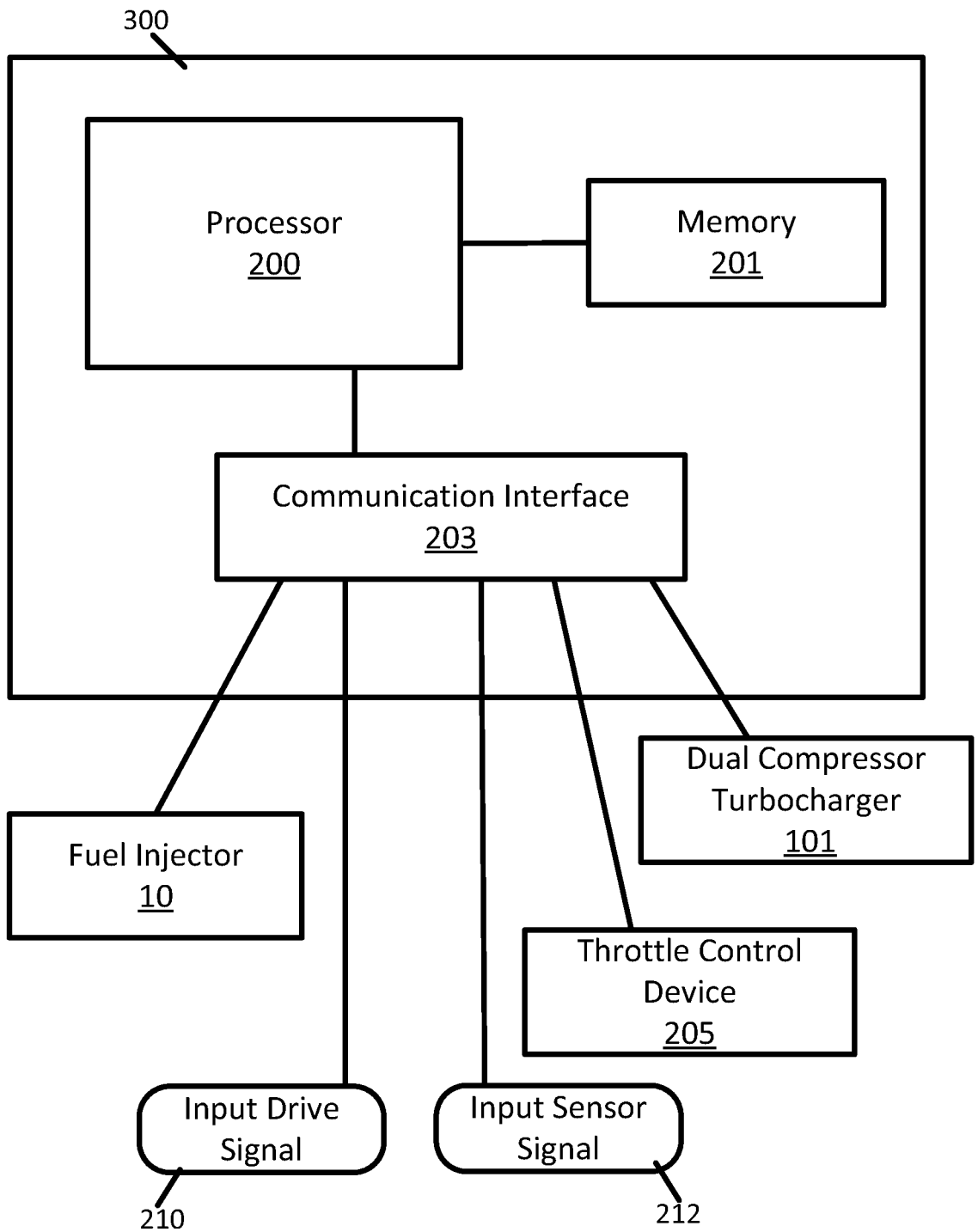
FIG. 9 illustrates an example control system for the dual compressor turbocharger.

FIG. 9 illustrates a control system for a gaseous engine. The control system includes a controller 300 having at least a processor 200, a memory 201, and a communication interface 203. Additional, fewer, or different components or arrangements are possible. The communication interface 203 may be electrically connected to a sensor array through an input sensor signal 212. The communication interface 203 may be electrically connected to a user input through an input run signal 210. The communication interface 203 may also be electrically connected to the dual compressor turbocharger 101, the fuel injector 10 and a throttle control device 205.

The communication interface 203 may be configured to receive one or more input signals including input data. The input signals may include individual input signals for multiple cylinders at some times and/or a joint or combined input signal at other times. The input signals may include a run signal 210 generated at an ignition (e.g., in response to a key turn or ignition switch) or at another controller (e.g., engine control unit). The input signals may include an input sensor signal 212. The input sensor signal 212 may represent sensor data generated at one or more of a pressure sensor, air flow meter, or a throttle sensor.

In one example, data from the pressure sensor is used to set an air to fuel ratio or duty cycle for defining the input signal. Other sensor data may be used at feedback to refine or finely tune the air to fuel ratio. The other sensor data may include temperature data from a temperature data, flow rate data from a flow meter, and ratio data from an air to fuel ratio sensor.

The controller 300 is configured to generate at least one control signal in response to the input data. One control signal may control the operation of the dual compressor turbocharger 101. The control signal may operate a wastegate to control the flow of air into a turbine of the dual compressor turbocharger 101. The control signal may the dual compressor turbocharger 101 on and off. The control signal may change the shape of vanes of the turbine to control the speed of the turbine, and accordingly, the pressure of fuel and air that is expelled from the dual compressor turbocharger 101.

Another control signal may move a plunger to mix a flow of air and gaseous fuel by selectively connecting a venturi pressure from the flow of air through an intake manifold to a chamber of the gaseous engine. The control signal may include a variable duty cycle. The duty cycle may be rated as a percentage of a time period for a high signal compared to the total time of the control signal. Example duty cycles include 1%, 5%, 10% or any percent. The percentage of the duty cycle may define an amount of time that plunger opens the fuel passage. The plunger may pulse in synchronization with the control signal. The duty cycle may directly correspond to the measured pressure in the manifold (e.g., as the pressure in the manifold decreases, the duty cycle decreases). The duty cycle may indirectly correspond to the air to fuel ratio (e.g., as the duty cycle is increased, the air to fuel ratio decreases).

The controller 300 may also be configured to control the throttle of the gaseous engine. The controller 300 may generate commands for the throttle control device 205, which may be another controller or a stepper motor configured to move a throttle plate to control the amount of air that enters the combustion chamber through the intake manifold. The controller 300 may coordinate the commands for the throttle control device 205 with the commands for the fuel injector 10. As more air allowed into the intake manifold by the throttle control device 205, more gaseous fuel is allowed into the intake manifold by the fuel injector. Alternatively, when the venturi passage is located in the cylinder head, as more air allowed into the cylinder head by the throttle control device 205, more gaseous fuel is allowed into the cylinder head by the fuel injector.

Figure 10:
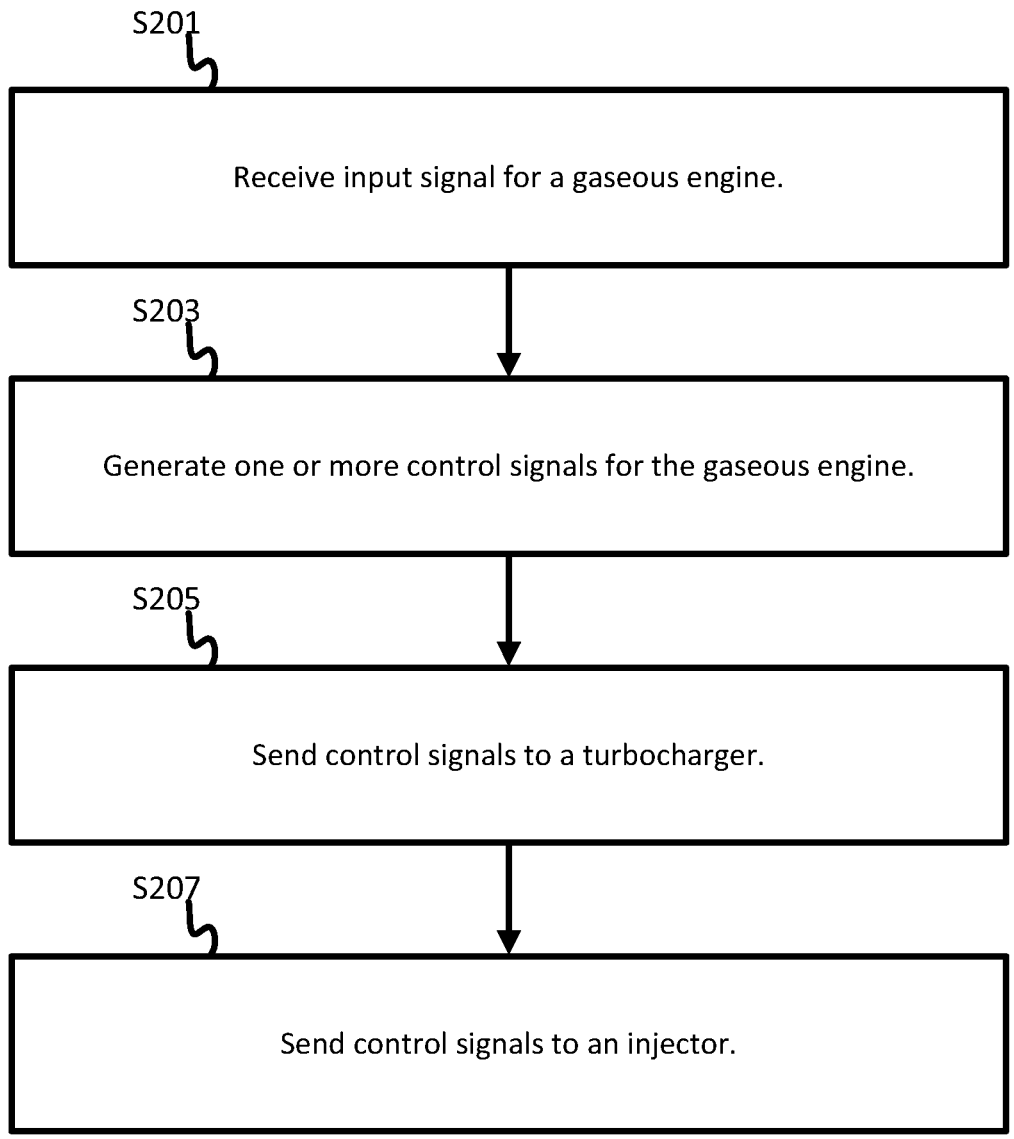
FIG. 10 illustrates an example flowchart for the control system of FIG. 9.

FIG. 10 illustrates an example flowchart for the control system of FIG. 9. Additional, different, or fewer acts may be provided. The acts may be performed in the order shown or other orders. The acts may also be repeated. The acts may be performed by any of the controllers described above.

At act S201, processor 200 receives an input signal. The input signal may be data from a throttle or from a sensor. The throttle data may be indicative of a user input requesting more power or higher revolutions per minute from the engine. The sensor data may be received at the controller 300 from various types of sensors described above. The sensor data may describe current operating conditions of a gaseous engine.

At act S203, the processor 200 generates one or more control signals for the gaseous engine. At act S205, the communication interface 203 may send control signals to the dual compressor turbocharger. The control signals may activate or deactivate the dual compressor turbocharger 130, activate or deactivate a wastegate for bypassing exhaust gas around the dual compressor turbocharger 130, or control variable geometry formations that change the speed of the dual compressor turbocharger 130.

At act S207, the communication interface 203 may send control signals to an injector. The memory 201 may include a lookup table that associated sensor data values to corresponding air to fuel ratios or duty cycles. The processor 200 may query the lookup table using sensor data to receive a duty cycle for controlling the flow of gaseous fuel, and the duty cycle defines the control signal for the injector.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the controller 300 such as a secure digital (SD) memory card.

The communication interface 203 may include any operable connection. An operable connection may be one in which signals, physical communications, and/or logical communications may be sent and/or received. An operable connection may include a physical interface, an electrical interface, and/or a data interface. The communication interface 203 provides for wireless and/or wired communications in any now known or later developed format.

The controller 300 may be connected to a network. The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The memory 201 may be a non-transitory computer-readable medium. While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A controller for an engine system, the controller comprising:
    a communication interface electrically connected to a dual compressor turbocharger, the dual compressor turbocharger including a first compressor mounted to a shaft and coupled to an air supply and an air intake of the engine and including a second compressor mounted on the shaft and coupled to a fuel supply and a fuel supply rail of the engine;
    a fuel injector configured to modify an air to fuel ratio of the engine system; and
    a processor configured to generate a dual compressor turbocharger control signal configured to control, in response to sensor data, the first compressor for air supply and the second compressor for fuel supply and configured to generate a fuel injector control signal configured to control the fuel injector to release fuel from the fuel supply rail to a plurality of cylinders in response to sensor data and the air to fuel ratio.

2. The controller of claim 1, wherein the sensor data is generated at one or more of a pressure sensor, an air flow meter, or a throttle sensor.

3. The controller of claim 1, wherein the dual compressor turbocharger control signal for the dual compressor turbocharger operates a wastegate to control a flow of air.

4. The controller of claim 1, wherein the dual compressor turbocharger control signal for the dual compressor turbocharger affects a position of a vane of a turbine.

5. The controller of claim 1, wherein the dual compressor turbocharger control signal for the dual compressor turbocharger sets a speed of a turbine.

6. The controller of claim 1, further comprising:
    a memory configured to store a lookup table for associating the sensor data to the dual compressor turbocharger control signal.

7. An engine system comprising:
    a fuel supply rail configured to deliver fuel;
    an air intake configured to deliver air;
    a turbine;
    a shaft coupled to the turbine;
    a first compressor mounted on the shaft and coupled to an air supply and the air intake of the engine system;
    a second compressor mounted on the shaft coupled to a fuel supply and the fuel supply rail of the engine system;
    a controller configured to determine an air to fuel ratio and generate, in response to the air to fuel ratio, a plurality of digital fuel injection drive signals to drive a plurality of cylinders through the release of fuel from the fuel supply rail, each of the plurality of digital fuel injection drive signals corresponding to an individual one of the plurality of cylinders,
    wherein the controller is configured to generate a control signal for the first compressor and the second compressor based on sensor data.

8. The engine system of claim 7, wherein the sensor data is generated at one or more of a pressure sensor, an air flow meter, or a throttle sensor.

9. The engine system of claim 7, wherein the control signal for the first compressor and the second compressor operates a wastegate to control a flow of air, the control signal for the first compressor and the second compressor affects a position of a vane of a turbine, or the control signal for the first compressor and the second compressor sets a speed of the turbine.

10. The engine system of claim 7, wherein the first compressor compresses air to a first pressure lower than a second pressure that the second compressor compresses fuel.

11. The engine system of claim 7, wherein air from the first compressor and fuel from the second compressor are mixed downstream of the first compressor and second compressor, respectively, and upstream of the engine.

12. The engine system of claim 7, wherein a capacity of the first compressor is greater than a capacity of the second compressor.

13. The engine system of claim 12, wherein the capacity of the first compressor and the capacity of the second compressor define an air to fuel ratio.

14. The engine system of claim 7, further comprising:
    a manifold;
    an injection port coupled to the manifold; and
    a combustion chamber coupled to the manifold,
    wherein a distance between the injection port and the combustion chamber is within a predetermined range of distances.

15. The engine system of claim 14, further comprising:
    a throttle, wherein the distance between the inject port and the combustion chamber provides a response time of the plurality of digital fuel injection drive signals that is faster in comparison to when the injection port is nearer the throttle.

16. A controller for an engine system, the controller comprising:

a communication interface electrically connected to a dual compressor turbocharger, the dual compressor turbocharger including a first compressor mounted to a shaft and coupled to an air supply and an air intake of the engine and including a second compressor mounted on the shaft and coupled to a fuel supply and a fuel supply rail of the engine; and a processor configured to generate a control signal for the first compressor and the second compressor based on sensor data, the processor further configured to determine an air to fuel ratio and generate, in response to the air to fuel ratio, a plurality of digital fuel injection drive signals to drive a plurality of cylinders through the release of fuel from the fuel supply rail, each of the plurality of digital fuel injection drive signals corresponding to an individual one of the plurality of cylinders.

* * * * *